Feb. 5, 1957  J. P. LOUGHLIN  2,780,486
CIRCULAR SAW BLADE CARRIER
Filed May 17, 1955
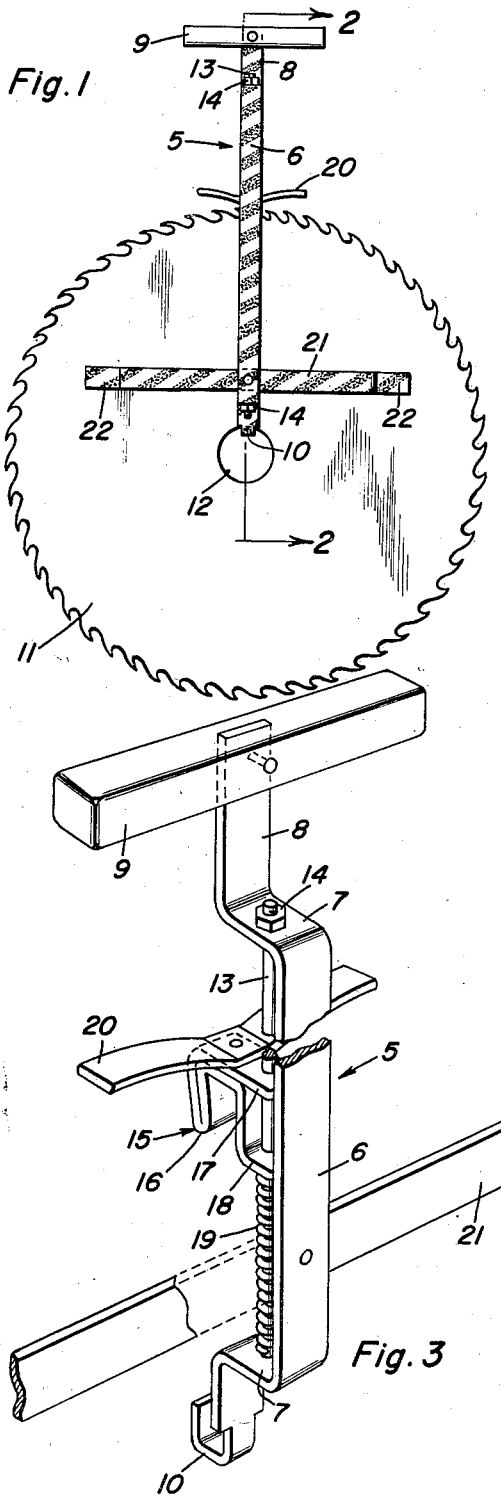
John P. Loughlin
INVENTOR.

United States Patent Office 2,780,486
Patented Feb. 5, 1957

2,780,486
CIRCULAR SAW BLADE CARRIER
John P. Loughlin, Shenandoah, Pa., assignor of one-half to Joseph A. Zane, Shenandoah, Pa.
Application May 17, 1955, Serial No. 508,946
3 Claims. (Cl. 294—34)

The present invention relates to new and useful improvements in circular saw blade carriers and has for its primary object to provide, in a manner as hereinafter set forth, novel means whereby such blades may be transported and handled with complete safety.

Another very important object of the invention is to provide a carrier of the aforementioned character which may be readily used on circular saw blades of various sizes.

Still another important object of the invention is to provide a device of the character described which may be conveniently carried in one hand and actuated by that hand for releasing the saw blade.

Other objects of the invention are to provide a circular saw blade carrier which will be simple in construction, strong, durable, compact, highly efficient and reliable in use and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a view in side elevation, showing a carrier constructed in accordance with the present invention in use;

Figure 2 is a vertical sectional view, taken substantially on the line 2—2 of Figure 1; and, Figure 3 is a perspective view of the device with portions thereof broken away.

Referring now to the drawing in detail, it will be seen that the embodiment of the invention which has been illustrated comprises a frame of suitable material which is designated generally by reference character 5. The frame 5 includes a substantially U-shaped bar 6 having apertured legs 7, said bar terminating in a vertical upper end portion 8 having rigidly mounted transversely thereon a handle 9. At its lower end, the bar 6 terminates in a depending, substantially hook-shaped stationary jaw 10 for engagement with a circular saw blade, as at 11, through the usual centrally located opening or eye 12 thereof.

Extending vertically between the apertured legs 7 of the bar 6 is a guide rod 13 of suitable metal having retaining nuts 14 threaded on the end portions thereof. A substantially hook-shaped slidable jaw 15 of suitable metal is operable on the rod 13 for engagement with the periphery of the blade 11 in the manner shown to advantage in Figure 2 of the drawing. The jaw 15 comprises a metallic bar which is bent or folded transversely upon itself at an intermediate point, as at 16, and which terminates in spaced, apertured end portions 17 and 18 which are slidable on the rod 13.

Also mounted on the rod 13, below the slidable jaw 15, is a coil spring 19. The lower end portion of the coil spring 19 is anchored to the lower end portion of the rod 13. The upper end portion of the coil spring 19 is anchored to the lower end portion 18 of the slidable jaw 15 for yieldingly engaging said jaw with the saw 11. Thus, the saw 11 is clamped between the jaws 10 and 15. Mounted transversely on top of the slidable jaw 15 is a finger piece or bar 20 for sliding said jaw upwardly on the rod 13 against the tension of the coil spring 19.

Mounted transversely on the lower portion of the bar 6 is a balance bar 21. The bar 21 terminates in offset end portions or feet 22 for engagement with the adjacent face of the saw blade 11 on opposite sides of the frame 5.

It is thought that the operation or manner of using the device will be readily apparent from a consideration of the foregoing. Briefly, gripping the handle 9 in one hand, the stationary lower jaw 10 is engaged with the blade 11 through the opening or eye 12 therein. The fingers of the hand which grips the handle 9 are then engaged under the finger piece 20 for elevating or opening the slidable upper jaw 15 against the tension of the coil spring 19. The upper jaw 15 is engaged over the periphery of the blade 11 and released. In this manner the blade is firmly gripped between the jaws 10 and 15 and may be safely carried or handled, wobbling of said blade being prevented by the bar 21. To release the blade the foregoing operation is substantially reversed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A circular saw blade carrier of the character described comprising: an elongated frame, a handle on said frame, a pair of opposed, coacting jaws on the frame engageable with the periphery and in the eye of the blade for clamping said blade therebetween, and a balance bar mounted transversely on the frame and engageable with the saw on opposite sides of said frame.

2. A circular saw blade carrier of the character described comprising: a frame including a substantially U-shaped bar, a rod extending between the legs of said bar, a stationary jaw on one end of the bar engageable with a blade through the eye thereof, a handle on the other end of the bar, a slidable jaw operable on the rod for engagement with the periphery of the blade and cooperable with the stationary jaw for clamping said blade therebetween, and a coil spring mounted on the rod and connected to the slidable jaw for yieldingly engaging same with the blade.

3. A circular saw blade carrier of the character described comprising: a frame including a substantially U-shaped bar, a rod extending between the legs of said bar, a stationary jaw on one end of the bar engageable with a blade through the eye thereof, a handle on the other end of the bar, a slidable jaw operable on the rod for engagement with the periphery of the blade and cooperable with the stationary jaw for clamping said blade therebetween, and a coil spring mounted on the rod and connected to the slidable jaw for yieldingly engaging same with the blade, said frame further including a bar mounted transversely on the U-shaped bar and including offset end portions engageable with the blade on opposite sides of said U-shaped bar for steadying said blade.

References Cited in the file of this patent
UNITED STATES PATENTS

| | | |
|---|---|---|
| 1,526,517 | Voght | Feb. 17, 1925 |
| 1,683,190 | Hughey et al. | Sept. 4, 1928 |
| 2,093,658 | Hildenbrand | Sept. 21, 1937 |
| 2,583,476 | Davidson | Jan. 22, 1952 |
| 2,679,430 | Byron | May 25, 1954 |